US008795784B2

(12) United States Patent
Standke et al.

(10) Patent No.: US 8,795,784 B2
(45) Date of Patent: Aug. 5, 2014

(54) AQUEOUS EMULSIONS OF FUNCTIONAL ALKOXYSILANES AND CONDENSED OLIGOMERS THEREOF, THEIR PREPARATION AND USE FOR SURFACE TREATMENT

(75) Inventors: Burkhard Standke, Loerrach (DE); Kerstin Weissenbach, Bad Saeckingen (DE); Bernd Bartkowiak, Wehr-Oeflingen (DE)

(73) Assignee: Evonik Degussa GmbH, Essen (DE)

( * ) Notice: Subject to any disclaimer, the term of this patent is extended or adjusted under 35 U.S.C. 154(b) by 1338 days.

(21) Appl. No.: 11/815,391

(22) PCT Filed: Dec. 8, 2005

(86) PCT No.: PCT/EP2005/056598
§ 371 (c)(1),
(2), (4) Date: Aug. 2, 2007

(87) PCT Pub. No.: WO2006/081892
PCT Pub. Date: Aug. 10, 2006

(65) Prior Publication Data
US 2008/0187673 A1 Aug. 7, 2008

(30) Foreign Application Priority Data
Feb. 3, 2005 (DE) .......................... 10 2005 004 872

(51) Int. Cl.
| C09D 5/16 | (2006.01) |
| B01J 31/02 | (2006.01) |
| C08L 5/00 | (2006.01) |
| C09K 3/00 | (2006.01) |
| B05D 3/00 | (2006.01) |
| C04B 41/49 | (2006.01) |
| C08J 3/03 | (2006.01) |
| C04B 41/00 | (2006.01) |
| C04B 111/00 | (2006.01) |

(52) U.S. Cl.
CPC .............. C08J 3/03 (2013.01); C04B 41/4961 (2013.01); C08J 2383/04 (2013.01); C04B 2111/00112 (2013.01); C04B 41/009 (2013.01)
USPC ........ 427/421.1; 524/156; 524/288; 524/147; 524/27; 106/18.32; 106/18.34; 106/217.7; 106/162.6; 106/287.32; 252/394; 252/395; 252/396; 502/158; 427/430.1

(58) Field of Classification Search
CPC .............. C04B 41/009; C04B 41/4961; C04B 2103/40; C04B 28/02; C04B 41/4922; C04B 41/502; C04B 2111/00112; C08J 2383/04; C08J 3/03
See application file for complete search history.

(56) References Cited

U.S. PATENT DOCUMENTS

| 4,226,793 A | 10/1980 | Kotzsch et al. |
| 5,306,856 A | 4/1994 | Streck et al. |
| 5,458,923 A * | 10/1995 | Goebel et al. ................. 427/387 |
| 5,531,812 A * | 7/1996 | Montigny et al. ................. 106/2 |
| 5,591,818 A | 1/1997 | Standke et al. |
| 5,629,400 A | 5/1997 | Standke et al. |
| 5,679,147 A | 10/1997 | Standke et al. |
| 5,744,675 A | 4/1998 | Fiolitakis et al. |
| 5,808,125 A | 9/1998 | Standke et al. |
| 5,849,942 A | 12/1998 | Standke et al. |
| 5,863,509 A | 1/1999 | Standke et al. |
| 5,885,341 A | 3/1999 | Standke et al. |
| 5,932,757 A | 8/1999 | Standke et al. |
| 6,054,601 A | 4/2000 | Standke et al. |
| 6,103,001 A | 8/2000 | Fisher et al. |
| 6,118,015 A | 9/2000 | Haas et al. |
| 6,133,466 A | 10/2000 | Edelmann et al. |
| 6,139,622 A | 10/2000 | Gobel et al. |
| 6,176,918 B1 | 1/2001 | Glausch et al. |
| 6,177,582 B1 | 1/2001 | Jenkner et al. |
| 6,228,936 B1 | 5/2001 | Standke et al. |
| 6,239,194 B1 | 5/2001 | Standke et al. |
| 6,251,989 B1 | 6/2001 | Edelmann et al. |
| 6,255,513 B1 | 7/2001 | Standke et al. |
| 6,288,256 B1 | 9/2001 | Standke et al. |
| 6,361,871 B1 | 3/2002 | Jenkner et al. |

(Continued)

FOREIGN PATENT DOCUMENTS

| CN | 1451471 | * 10/2003 | .............. B01F 17/54 |
| DE | 198 14 267 | 4/1999 | |

(Continued)

OTHER PUBLICATIONS

U.S. Appl. No. 12/161,112, filed Jul. 16, 2008, Standke, et al.
U.S. Appl. No. 12/596,725, filed Oct. 20, 2009, Giessler-Blank, et al.
U.S. Appl. No. 12/673,390, filed Feb. 16, 2010, Wassmer, et al.
U.S. Appl. No. 11/572,688, filed Jan. 25, 2007, Edelmann, et al.
U.S. Appl. No. 12/674,271, filed Feb. 19, 2010, Albert, et al.
U.S. Appl. No. 12/678,299, filed Mar. 16, 2010, Borup, et al.
U.S. Appl. No. 11/569,363, filed Nov. 20, 2006, Standke, et al.
U.S. Appl. No. 11/572,555, filed Jan. 23, 2007, Just, et al.
U.S. Appl. No. 11/576,504, filed Apr. 2, 2007, Mueh, et al.
U.S. Appl. No. 11/718,442, filed May 2, 2007, Standke.
U.S. Appl. No. 11/814,127, filed Jul. 17, 2007, Standke, et al.

(Continued)

Primary Examiner — Yun Qian
(74) Attorney, Agent, or Firm — Oblon, Spivak, McClelland, Maier & Neustadt, L.L.P.

(57) ABSTRACT

Aqueous oil-in-water emulsion comprising from 1 to 70% by weight, based on the total weight of the emulsion, of functional alkoxysilanes and/or condensed oligomers thereof and/or organoalkoxysiloxanes, at least one emulsifier and water, wherein the emulsion has a pH of from 5 to 9 and preferably a mean droplet size of the disperse phase of ≤0.5 μm, and the width of the droplet size distribution, expressed as the span (Formula I), is from 0.6 to 1.2. The preparation of the emulsions having the desired droplet size distribution is carried out in apparatuses having at least one pressure stage at a pressure of from 2 to 15 MPa. The emulsion can be used for hydrophobicizing porous mineral building materials.

19 Claims, No Drawings

(56) References Cited

U.S. PATENT DOCUMENTS

| | | |
|---|---|---|
| 6,395,858 B1 | 5/2002 | Mack et al. |
| 6,403,228 B1 | 6/2002 | Mack et al. |
| 6,491,838 B1 | 12/2002 | Standke et al. |
| 6,500,883 B1 | 12/2002 | Mack et al. |
| 6,528,585 B1 | 3/2003 | Standke et al. |
| 6,534,667 B1 | 3/2003 | Standke et al. |
| 6,641,870 B2 | 11/2003 | Bartkowiak et al. |
| 6,663,683 B2 | 12/2003 | Lortz et al. |
| 6,676,719 B2 | 1/2004 | Lortz et al. |
| 6,685,766 B2 | 2/2004 | Standke et al. |
| 6,689,468 B2 | 2/2004 | Edelmann et al. |
| 6,695,904 B2 | 2/2004 | Burger et al. |
| 6,699,586 B2 | 3/2004 | Edelmann et al. |
| 6,713,186 B1 | 3/2004 | Jenkner et al. |
| 6,767,377 B2 | 7/2004 | Schumacher et al. |
| 6,767,982 B2 | 7/2004 | Standke et al. |
| 6,770,327 B2 | 8/2004 | Edelmann et al. |
| 6,773,697 B2 | 8/2004 | Hemme et al. |
| 6,773,814 B2 | 8/2004 | Schumacher et al. |
| 6,808,769 B2 | 10/2004 | Batz-Sohn et al. |
| 6,830,816 B2 | 12/2004 | Mehnert et al. |
| 6,841,197 B2 | 1/2005 | Standke et al. |
| 6,864,323 B2 | 3/2005 | Schlosser et al. |
| 6,905,632 B2 | 6/2005 | Lortz et al. |
| 6,946,537 B2 | 9/2005 | Krafczyk et al. |
| 6,991,190 B2 | 1/2006 | Lortz et al. |
| 7,015,270 B2 | 3/2006 | Scharfe et al. |
| 7,026,398 B2 | 4/2006 | Monkiewicz et al. |
| 7,083,769 B2 | 8/2006 | Moerters et al. |
| 7,244,302 B2 | 7/2007 | Schumacher et al. |
| 7,255,735 B2 | 8/2007 | Meyer et al. |
| 7,374,787 B2 | 5/2008 | Lortz et al. |
| 7,399,487 B2 | 7/2008 | Batz-Sohn et al. |
| 7,423,165 B2 | 9/2008 | Korth et al. |
| 7,423,186 B2 | 9/2008 | Standke et al. |
| 7,427,442 B2 | 9/2008 | Albert et al. |
| 7,470,423 B2 | 12/2008 | Lortz et al. |
| 7,538,142 B2 | 5/2009 | Lortz et al. |
| 7,572,854 B2 | 8/2009 | Schneider et al. |
| 7,578,877 B2 | 8/2009 | Giessler et al. |
| 7,615,577 B2 | 11/2009 | Lortz et al. |
| 7,625,975 B2 | 12/2009 | Barfurth et al. |
| 7,645,335 B2 | 1/2010 | Lortz et al. |
| 7,749,322 B2 | 7/2010 | Schumacher et al. |
| 7,780,777 B2 | 8/2010 | Perlet et al. |
| 7,815,936 B2 | 10/2010 | Hasenzahl et al. |
| 7,976,719 B2 | 7/2011 | Batz-Sohn et al. |
| 8,012,367 B2 | 9/2011 | Hasenzahl et al. |
| 8,298,679 B2 | 10/2012 | Albert et al. |
| 2002/0090316 A1* | 7/2002 | Standke et al. ........... 422/1 |
| 2002/0098243 A1 | 7/2002 | Edelmann et al. |
| 2002/0127415 A1 | 9/2002 | Standke et al. |
| 2002/0197311 A1 | 12/2002 | Hasenzahl et al. |
| 2003/0018155 A1 | 1/2003 | Krafczyk et al. |
| 2003/0108580 A1 | 6/2003 | Hasenzahl et al. |
| 2003/0134969 A1 | 7/2003 | Schlosser et al. |
| 2003/0203117 A1 | 10/2003 | Bartkowiak et al. |
| 2003/0228271 A1 | 12/2003 | Batz-Sohn et al. |
| 2004/0240062 A1 | 12/2004 | Lortz et al. |
| 2005/0169861 A1 | 8/2005 | Lortz et al. |
| 2005/0265934 A1 | 12/2005 | Schumacher et al. |
| 2006/0063002 A1 | 3/2006 | Edelmann et al. |
| 2006/0104881 A1 | 5/2006 | Lortz et al. |
| 2006/0159635 A1 | 7/2006 | Meyer et al. |
| 2006/0159636 A1 | 7/2006 | Meyer et al. |
| 2006/0159637 A1 | 7/2006 | Meyer et al. |
| 2006/0163533 A1 | 7/2006 | Batz-Sohn et al. |
| 2006/0229210 A1 | 10/2006 | Neugebauer et al. |
| 2006/0292192 A1 | 12/2006 | Hasenzahl et al. |
| 2007/0054056 A1 | 3/2007 | Albert et al. |
| 2007/0099004 A1 | 5/2007 | Edelmann et al. |
| 2007/0110906 A1 | 5/2007 | Edelmann et al. |
| 2007/0110912 A1 | 5/2007 | Standke et al. |
| 2007/0231280 A1 | 10/2007 | Schumacher et al. |
| 2007/0297998 A1 | 12/2007 | Meyer et al. |
| 2008/0027161 A1 | 1/2008 | Schlosser et al. |
| 2008/0058489 A1 | 3/2008 | Edelmann et al. |
| 2008/0095724 A1 | 4/2008 | Hasenzahl et al. |
| 2008/0206572 A1 | 8/2008 | Edelmann et al. |
| 2008/0210130 A1 | 9/2008 | Giessler-Blank et al. |
| 2008/0213325 A1 | 9/2008 | Schumacher et al. |
| 2008/0221318 A1 | 9/2008 | Edelmann et al. |
| 2008/0233341 A1 | 9/2008 | Jenkner et al. |
| 2008/0249237 A1 | 10/2008 | Hager et al. |
| 2008/0264299 A1 | 10/2008 | Lortz et al. |
| 2009/0007818 A1 | 1/2009 | Militz et al. |
| 2009/0011246 A1 | 1/2009 | Giessler-Blank et al. |
| 2009/0022898 A1 | 1/2009 | Standke et al. |
| 2009/0047225 A1 | 2/2009 | Hasenzahl et al. |
| 2009/0131694 A1 | 5/2009 | Schumacher et al. |
| 2009/0186053 A1 | 7/2009 | Meyer et al. |
| 2009/0261309 A1 | 10/2009 | Lortz et al. |
| 2010/0015339 A1 | 1/2010 | Morillo et al. |
| 2010/0117021 A1 | 5/2010 | Batz-Sohn et al. |
| 2010/0209339 A1 | 8/2010 | Schumacher et al. |
| 2010/0209719 A1 | 8/2010 | Borup et al. |
| 2010/0233392 A1 | 9/2010 | Batz-Sohn et al. |
| 2010/0308287 A1 | 12/2010 | Lortz et al. |
| 2011/0034584 A1 | 2/2011 | Albert et al. |
| 2011/0045723 A1 | 2/2011 | Nowak et al. |
| 2011/0071256 A1 | 3/2011 | Nowak et al. |
| 2011/0124794 A1 | 5/2011 | Friedel et al. |
| 2011/0259240 A1 | 10/2011 | Jenkner et al. |
| 2011/0308423 A1 | 12/2011 | Friedel et al. |
| 2012/0031302 A1 | 2/2012 | Albert et al. |
| 2012/0080637 A1 | 4/2012 | Herzog et al. |
| 2012/0204762 A1 | 8/2012 | Albert et al. |
| 2012/0321803 A1 | 12/2012 | Borup et al. |
| 2013/0037744 A1 | 2/2013 | Weissenbach et al. |
| 2013/0040058 A1 | 2/2013 | Friedel et al. |

FOREIGN PATENT DOCUMENTS

| | | | |
|---|---|---|---|
| EP | 0 340 816 | 11/1989 | |
| EP | 0 616 989 | 9/1994 | |
| EP | 0 776 873 | 6/1997 | |
| WO | WO2006081891 | * 8/2006 | ........... C09D 183/04 |

OTHER PUBLICATIONS

U.S. Appl. No. 10/112,045, filed Apr. 1, 2002, Mehnert, et al.
U.S. Appl. No. 12/673,289, filed Feb. 12, 2010, Koschabek, et al.
U.S. Appl. No. 12/675,057, filed Feb. 24, 2010, Spyrou, et al.
U.S. Appl. No. 12/992,684, filed Mar. 4, 2011, Nowak, et al.
U.S. Appl. No. 13/058,290, filed Feb. 9, 2011, Weissenbach, et al.
U.S. Appl. No. 13/059,546, filed Feb. 17, 2011, Weissenbach, et al.
U.S. Appl. No. 13/062,225, filed Mar. 4, 2011, Weissenbach, et al.
U.S. Appl. No. 61/093,219, filed Aug. 29, 2008, Simoes.
U.S. Appl. No. 13/061,451, filed Feb. 28, 2011, Weissenbach, et al.
U.S. Appl. No. 13/011,115, filed Jan. 21, 2011, Ruf, et al.
U.S. Appl. No. 61/034,814, filed Mar. 7, 2008, Morillo, et al.
U.S. Appl. No. 13/257,488, filed Oct. 21, 2011, Standke, et al.
U.S. Appl. No. 13/256,557, filed Sep. 14, 2011, Scharfe, et al.
U.S. Appl. No. 13/638,733, filed Oct. 1, 2012, Friedel, et al.
U.S. Appl. No. 13/638,734, filed Oct. 1, 2012, Friedel, et al.
U.S. Appl. No. 13/640,638, filed Oct. 11, 2012, Friedel, et al.
U.S. Appl. No. 13/638,619, filed Oct. 1, 2012, Friedel, et al.

* cited by examiner

AQUEOUS EMULSIONS OF FUNCTIONAL ALKOXYSILANES AND CONDENSED OLIGOMERS THEREOF, THEIR PREPARATION AND USE FOR SURFACE TREATMENT

CROSS REFERENCE TO RELATED APPLICATION

This application is a 371 of PCT/EP05/056598, filed on Dec. 8, 2005, and claims priority to German Patent Application No. 102005004872.2, filed on Feb. 3, 2005.

The present invention relates to aqueous oil-in-water emulsions of functional alkoxysilanes and condensed oligomers thereof, the preparation of the emulsions in high-pressure emulsification apparatuses and their use for the surface treatment of organic and inorganic materials, in particular for the hydrophobicization of mineral building materials.

Aqueous emulsions of alkoxysilanes and organopolysiloxanes, their preparation and their use have been described in many publications.

EP-A 0 442 098 discloses a process for preparing transparent aqueous organopolysiloxane emulsions in which the mean particle size of the nonaqueous phase is less than 0.3 μm (preferably less than 0.1 μm). A concentrate is firstly prepared from liquid organopolysiloxanes, water and an emulsifier soluble in polyorganosiloxane by means of suitable turbulent mixing apparatuses under a pressure of from 0.01 to 1 MPa (HBS) and this is, in a second step, diluted with water to the desired concentration under comparable conditions and the pH of the emulsion is adjusted to 3-7 by addition of acid. The emulsions can be used, inter alia, as paints or impregnants for building materials.

U.S. Pat. No. 5,746,810 describes stable aqueous emulsions of alkylalkoxysilanes which have active contents of from 5 to 70% by weight and whose disperse phase has a droplet diameter of from 0.5 to 10 μm and which are suitable for making building materials water-repellent. The desired particle size is achieved by choice of the machine and its operating conditions for emulsification. It is possible to use, inter alia, commercial high-pressure homogenizers.

U.S. Pat. No. 6,103,001 and WO 00/3406 describe stable aqueous emulsions of alkoxysilanes, alkylalkoxysilanes having an active content of from 1 to 65% by weight as hydrophobicizing agents for wood and building materials. The emulsions have a viscosity of from >5 to 1000 mm$^2$/second and a particle size of the disperse phase of less than 10 μm, preferably less than 1 μm, very particularly preferably less than 0.5 μm or from 0.276 μm to 0.924 μm. The emulsions comprise, in addition to water and the alkoxysilanes, an emulsifier system comprising at least two emulsifiers having different HLB values. The particle size is set by preemulsifying the constituents and subsequently passing them through a two-stage pressure homogenizer at pressures of 52 MPa/16 MPa.

EP-A 0 761 724 discloses the continuous preparation of aqueous organopolysiloxane emulsions by passing them one or more times through two-stage homogenizers at shear rates of at least 100 seconds$^{-1}$, preferably from 10 000 to 300 000 seconds$^{-1}$, under pressures of from 0.98 to 1.37 bar. The mean particle size is 0.3 μm or 0.4 μm. A paste-like emulsion was prepared from a dimethylpolysiloxane having terminal trimethylsiloxy groups and polyoxyethylene lauryl ether and cetyltriammonium chloride as emulsifiers.

U.S. Pat. No. 5,591,818 and EP-A 0 590 270 disclose organosilanes and polycondensation products thereof which are prepared by hydrolysis of a functional aminosilane hydrosalt or by hydrolytic polymerization of an aminosilane with subsequent functionalization by reaction with a functional alkyl halide. The compounds can be formulated as stable aqueous emulsions and can be used as adhesion promoters between inorganic and organic materials.

U.S. Pat. No. 5,073,195 discloses compositions for making substrates water-repellent which can be used for treating porous surfaces and are aqueous solutions of a silane coupling agent and an alkyltrialkoxysilane having $C_1$-$C_6$-alkyl groups on the silicon atom. The solutions are used for the treatment of support materials such as wood, concrete, lime-sand brick or other unreactive building material surfaces.

At the 39th annual conference of the Institut für verstärkte Kunststoffe/Verbundwerkstoff der Gesellschaft der Kunststoffindustrie on January 16-19, 1984, E. P. Plueddemann reported silanols and siloxanes as coupling agents and for primers.

In U.S. Pat. No. 3,734,763, Plueddemann describes cationic unsaturated amino-functional silane coupling agents. $(CH_3O)_3Si(CH_2)_3NHCH_2CH_2NH_2$ and $(CH_3O)_3Si(CH_2)_3NHCH_2CH_2NHCH_2C_6H_4$—$CH=CH_2$ were obtained by controlled hydrolysis. The hydrolysate can be in the form of partial condensates. The patent describes the reaction of numerous organofunctional amines and aminosilanes with organofunctional alkyl halides in organic solvents. The products can be used as adhesion promoters between organic and inorganic surfaces and also for primers.

EP-A 0 616 989 describes hydrophobicizing aqueous impregnation emulsions for mineral building materials. These comprise organosilanes and/or organosiloxane resins having reactive groups. The disperse phase has a mean particle size of from 0.55 to 1.1 μm and a width of the particle size distribution of less than 1.3. The particle size distribution is set in jet dispersers or high-pressure homogenizers in which a preemulsion is pushed through a nozzle under high pressure. Here, it is necessary to push the emulsion through the nozzle a number of times or to use apparatuses which have a plurality of nozzles arranged in series.

EP-A 0 538 555 pertains to aqueous emulsions comprising organosilicon compounds for the impregnation of inorganic materials, in particular building materials. The emulsions comprise water, at least one alkoxysilane and, if appropriate, oligomers thereof, one or more anionic surfactants and silicon-functional surfactants and customary auxiliaries. Stable emulsions are obtained by use of high-pressure homogenizers with two passes at pressures of from 8 to 50 MPa and from 10 to 70 MPa, with the pressure drop in the second pressure stage being 20%. Droplet sizes of <1 μm are achieved.

EP-A 0 819 665 discloses aqueous pastes of organosilicon compounds which comprise $C_8$-$C_{20}$-alkylsilanes, $C_2$-$C_6$-alkoxysilanes and/or organopolysiloxanes containing alkoxy groups and, if appropriate, alkoxysilanes or organopolysiloxanes containing aminoalkyl groups, emulsifier and water for the hydrophobicization of building materials. Pressure emulsification machines, colloid mills or high-speed stator-rotor stirring apparatuses are used for preparing them.

The paste-like aqueous emulsions of organosilicon compounds described in WO 00/46167 differ from those known from EP-A 0 819 665 only in that organic solvents which are immiscible with water are present.

It is an object of the present invention to provide aqueous emulsions of functional alkoxysilanes and condensed oligomers thereof (hereinafter also referred to as oligomers for short) which can be used for the surface treatment of materials and are sufficiently storage-stable both in concentrated form and after dilution with an equal amount of water.

This object is achieved by aqueous oil-in-water emulsions comprising from 1 to 70% by weight, preferably from 5 to 50% by weight, based on the total weight of the emulsion, of functional alkoxysilanes and/or condensed oligomers thereof and/or organoalkoxysiloxanes, at least one emulsifier and water, wherein the emulsions have a pH of from 5 to 9, preferably from 7 to 8.5, and the width of the droplet size distribution, expressed as the span $$\frac{D90 - D10}{D50},$$

is from 0.6 to 1.2.

The achievement of the object of the invention also encompasses a process for preparing these aqueous oil-in-water emulsions comprising functional alkoxysilanes and/or condensed oligomers thereof and/or organoalkoxysiloxanes, at least one emulsifier and water by (i) premixing the constituents and (ii) emulsifying the mixture in a high-pressure homogenizer having at least one pressure stage and a pressure of from 2 to 15 MPa, so that the width of the droplet size distribution, expressed as the span $$\frac{D90 - D10}{D50},$$

is from 0.6 to 1.2.

The mean droplet size of the disperse phase is appropriately less than 0.5 µm, particularly preferably <0.4 µm, particularly preferably from 0.1 to 0.3 µm.

For the purposes of the present invention, the mean droplet diameter (droplet size) is the calculated volume average diameter of a droplet given by dividing the total volume of all droplets of the emulsion by the number of droplets.

The numerical value for the width of the droplet size distribution is determined so that, of the given quantity of droplets, the droplets having the smallest diameters up to an amount of 10% by weight of the droplets (D10) and the droplets having the largest diameters up to an amount of 10% by weight (D90) are disregarded and the difference between the diameters of the remaining largest droplet and the remaining smallest droplet is divided by the diameter of that droplet (D50) which is larger than 50% by weight of all droplets and smaller than 50% by weight of all droplets. This numerical value for the width of the distribution [(D90-D10)/D50)] will for the purposes of the invention be referred to as the span.

The droplet diameter and the width of the distribution can be determined using a Coulter® LS particle size analyzer, with, if necessary, the droplet size distribution being depicted graphically by plotting the percentage by volume of the droplets against the droplet diameter (this preferably on a logarithmic scale).

In the case of a monomodal distribution, the curve has one maximum, and in the case of a bimodal distribution it has two maxima.

If the position of the maximum of such a distribution curve is reported in the following in µm, this reported value relates in the case of a bimodal or multimodal distribution to the first maximum having the smallest droplet diameter.

This droplet size distribution is achieved by use of selected emulsification conditions and apparatuses. Jet dispersers or high-pressure homogenizers as described, for example, in EP-A 0 101 007 or EP-A 0 761 724 have been found to be particularly useful. Such homogenizers are obtainable, for example, from APV Gaulin GmbH, Lübeck. In these apparatuses, the setting and reporting of the pressure involves mechanical setting of the width of the nozzles or the nozzle gap.

Preference is given to using a pressure of from 4 to 8 MPa, very particularly preferably from 5 to 6 MPa, in the at least one pressure stage.

The emulsification in (ii) can be carried out using two pressure stages having different pressures.

In one embodiment of the process for preparing aqueous oil-in-water emulsions comprising from 1 to 70% by weight, based on the total weight of the emulsion, of functional alkoxysilanes and condensed oligomers of functional alkoxysilanes or condensed oligomers of functional alkoxysilanes, at least one emulsifier and water, the following procedure is employed at a proportion of condensed oligomers of functional alkoxysilanes of ≥25% by weight, based on the total weight of the organosilicon compounds: (i) premixing of the constituents, (ii) emulsification in a high-pressure homogenizer having at least one pressure stage and a pressure of from 2 to 15 MPa, so that the mean droplet size is preferably less than 0.5 µm, in particular less than 0.4 µm, and the width of the droplet size distribution, expressed as the span $$\frac{D90 - D10}{D50},$$

is from 0.6 to 1.2.

In another embodiment of the process for preparing aqueous oil-in-water emulsions comprising from 1 to 70% by weight, based on the total weight of the emulsion, of functional alkoxysilanes and condensed oligomers of functional alkoxysilanes or condensed oligomers of functional alkoxysilanes, at least one emulsifier and water and having a proportion of condensed oligomers of functional alkoxysilanes of from 5 to <25% by weight, based on the total weight of the organosilicon compounds, the following procedure is employed: (i) premixing of the constituents, (iii) preemulsification in a high-pressure homogenizer having at least one pressure stage under a pressure of from 10 to 70 MPa and (ii) emulsification in a high-pressure homogenizer having at least one pressure stage and a pressure of from 2 to 15 MPa, so that the mean droplet size is preferably less than 0.5 µm, in particular less than 0.4 µm, and the width of the droplet size distribution, expressed as the span $$\frac{D90 - D10}{D50},$$

is from 0.6 to 1.2.

In particular embodiments of the process of the invention, a preemulsification (iii) is preferably additionally carried out in the high-pressure homogenizer having at least one pressure stage under a pressure of from 10 to 70 MPa, preferably from 20 to 40 MPa, after the premixing step (i) and before the emulsification step (ii).

After leaving the high-pressure homogenizer, the emulsions can be cooled, or precooled mixtures can also be emulsified.

The functional alkoxysilanes are selected from among alkoxysilanes or mixtures of the formulae $R^1$—$Si(OR^2)_3$, $(R^1)_2$—$Si(OR^2)_2$, where the radicals $R^1$ are identical or different and are each $C_3$-$C_{18}$-alkyl, halogen- or amino-substituted $C_3$-$C_{18}$-alkyl, vinyl, mercaptoalkyl, methacryloxyalkyl, acryloxyalkyl, alkylaminoalkyl, dialkylaminoalkyl, diethyleneaminoalkyl, triethyleneaminoalkyl, glycidyloxyalkyl, bisalkoxysilylalkyl, monosulfane or polysulfane and $R^2$ is an alkyl radical having from 1 to 6 carbon atoms, preferably 1 or 2 carbon atoms.

Examples which may be mentioned are methyltrimethoxysilane, methyltriethoxysilane, ethyltrimethoxysilane, ethyltriethoxysilane, n- and i-propyltrimethoxysilane, n- and i-propyltriethoxysilane, n- and i-butyltrimethoxysilane, n- and i-butyltriethoxysilane, n- and i-pentyltrimethoxysilane, n- and i-pentyltriethoxysilane, n- and i-hexyltrimethoxysilane, n- and i-octyltrimethoxysilane, n- and i-octyltriethoxysilane, hexadecyltrimethoxysilane, hexadecyltriethoxysilane, octadecyltrimethoxysilane, octadecyltriethoxysilane, dimethyidimethoxysilane, dimethyldiethoxysilane, n- and i-butylmethyidiethoxysilane, n- and i-butylmethyidiethoxysilane, cyclohexylmethyidimethoxysilane, diisopropyidimethoxysilane, diisobutyidimethoxysilane, isobutyl-isopropyidimethoxysilane, vinyltrimethoxysilane, vinyltriethoxysilane, vinyltris(2-methoxyethoxysilane), 3-aminopropyltrimethoxysilane, 3-aminopropyltriethoxysilane, N-(n-butyl)-3-aminopropyltrimethoxysilane, 3-aminopropylmethyidiethoxysilane, 3-ureidopropyltrimethoxysilane, 3-ureidopropyltriethoxysilane, N-aminoethyl-3-aminopropyltrimethoxysilane, N-aminoethyl-3-aminopropyltriethoxysilane, triamino-functional propyltrimethoxysilane, 3-(4,5-dihydroimidazolyl)propyltriethoxysilane, 3-glycidyloxypropyltrimethoxysilane, 3-glycidyloxypropyltriethoxysilane, tridecafluorooctyltriethoxysilane, tridecafluorooctyl-trimethoxysilane, tridecafluoro-1,1,2,2-tetrahydrooctyltriethoxysilane, tridecafluoro-1,1,2,2-tetrahydrooctyltrimethoxysilane, acryloxypropyltrimethoxysilane, acryloxypropyltriethoxysilane, 3-methacryloxypropyltrimethoxysilane, 3-methacryloxypropyltriethoxysilane, 3-methacryloxy-2-methylpropyltrimethoxysilane, 3-methacryloxy-2-methylpropyltriethoxysilane, mercaptopropyltrimethoxysilane, mercaptopropyltriethoxysilane, bis(triethoxysilylpropyl)tetrasulfane, bis(trimethoxysilylpropyl)tetrasulfane, bis(triethoxysilylpropyl)disulfane, bis(trimethoxysilylpropyl)disulfane, bis(triethoxysilylpropyl)sulfane, bis(trimethoxysilylpropyl)sulfane, bis(triethoxysilylpropyl)pentasulfane, bis(trimethoxysilylpropyl)pentasulfane.

Particularly preferred functional alkoxysilanes are n- and i-butyltrimethoxysilane, n- and i-butyltriethoxysilane, n-propyltrimethoxysilane, n-propyltriethoxysilane, n- and i-octyltrimethoxysilane, n- and i-octyltriethoxysilane, vinyltrimethoxysilane, vinyltriethoxysilane.

Together with functional alkoxysilanes, it is also possible to use oligomers of functional alkoxysilanes for the oil phase. This has the advantage that the boiling point and flash point of the compounds forming the oil phase in the emulsion or the mixture thereof is increased. The content of silane, oligomer or siloxane in the oil phase can also be adjusted by addition of a suitable organic solvent, for example but not exclusively aliphatic and aromatic hydrocarbons having a boiling point above room temperature, e.g. $C_6$-$C_{12}$-alkanes, petroleum spirit, naphtha, diesel, kerosene, toluene, xylene, alcohols or polyols, e.g. pentanol, hexanol, octanol, nonanol, isononanol, glycerol, ethers, esters, aldehydes, ketones or a mixture of at least two of the abovementioned organic solvents.

It has surprisingly been found that the emulsification behavior of the oil phase is improved by the presence of the oligomers and it is possible to achieve smaller droplet diameters than in the emulsification of alkoxysilanes.

The amount of oligomers which is advantageous for this purpose is at least 5% by weight, based on the total weight of the oil phase of the mixture of functional alkoxysilane(s) and oligomers. The oligomer content can be from 5 to 45% by weight, preferably from 5 to 66.7% by weight, but also up to 100% by weight, based on the total weight of the oil phase.

These oligomers are based essentially on alkyl-functional (cf. $R^1$ in the formula below) alkoxysilanes whose alkyl functions may be substituted or contain double bonds, i.e. are then an alkenyl function, and whose alkoxy functions may partly be in hydrolyzed form and are selected from among oligomers or oligomer mixtures of the formula

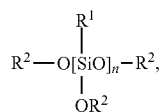

where $R^1$ is $C_3$-$C_{18}$-alkyl, halogen- or amino-substituted $C_3$-$C_{18}$-alkyl, vinyl, mercaptoalkyl, methacryloxyalkyl, acryloxyalkyl, alkylaminoalkyl, dialkylaminoalkyl, diethyleneaminoalkyl, triethyleneaminoalkyl, glycidyloxyalkyl, bisalkoxysilylalkyl, monosulfane or polysulfane, the groups $R^2$ are identical or different and are each a hydrogen atom or an alkyl radical having from 1 to 6 carbon atoms, preferably 1 or 2 carbon atoms, and n determines the degree of oligomerization and has a value of from 2 to 40, preferably from 2 to 20, particularly preferably from 3 to 6. These are oligomer mixtures having a mean degree of oligomerization of from 3 to 20, preferably from 4 to 6. Said oligomers can be in linear, cyclic or branched form. These oligomers can also be referred to as homooligomers in view of their functionality ($R^1$).

Preferred examples of oligomers are those having the radicals:

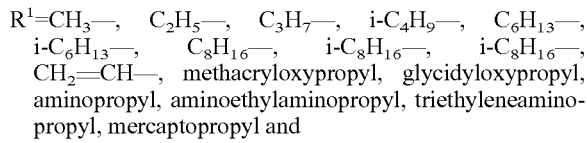
$CH_2$=$CH$—, methacryloxypropyl, glycidyloxypropyl, aminopropyl, aminoethylaminopropyl, triethyleneaminopropyl, mercaptopropyl and $R^2$=methyl or ethyl.

Particularly preferred oligomers are n-propylalkoxysiloxanes, n- and i-butylalkoxysilanes, n- and i-octylalkoxysiloxanes, vinylalkoxysiloxanes.

The particularly preferred oligomers or mixtures thereof give, together with the functional alkoxysilanes to be used according to the invention for the emulsions, oil phases having sufficiently high flash points.

When sole use is made of functional alkoxysilanes or mixtures thereof, preference is given to using ones whose flash point is above 55° C., particularly preferably above 100° C.

In the case of mixtures of functional alkoxysilanes with oligomers thereof and/or cooligomers described below, the proportion of oligomers and/or cooligomers can be from 1 to 100% by weight, based on the total weight of the oil phase. The content of oligomers and/or cooligomers in the oil phase is preferably from 70 to 100% by weight and from 1 to 40% by weight; particular preference is given to systems having a content of oligomers and/or cooligomers in the oil phase of from 90 to 98% by weight and from 5 to 30% by weight.

Said cooligomers are organoalkoxysiloxanes or mixtures thereof having the formula

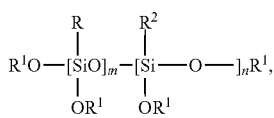

where m and n are identical or different and are each from 0 to 20, with the proviso that (n+m)≥2, R and $R^2$ are identical or different and are each hydrogen (H), $C_1$-$C_{18}$-alkyl, halogen- or amino-substituted $C_1$-$C_{18}$-alkyl, phenyl, vinyl, mercaptoalkyl, methacryloxyalkyl, acryloxyalkyl, alkylaminoalkyl, dialkylaminoalkyl, diethyleneaminoalkyl, triethyleneaminoalkyl, glycidyloxyalkyl, bisalkoxysilylalkyl, monosulfane or polysulfane, and the groups $R^1$ are identical or different and are each a hydrogen atom or an alkyl radical having from 1 to 6 carbon atoms, preferably 1 or 2 carbon atoms. Such organosiloxanes, too, can be in linear, cyclic and/or branched form. The abovementioned organosiloxanes can also be referred to as mixed oligomers.

Examples of mixed oligomers are (n+m meets the same criteria given above under n on page 11 for the homooligomers):

$R^1$: methyl or ethyl or H,

R: $C_3H_7$—, $R^2$: $CH_2$=CH—,

R: mercaptopropyl, $R^2$: propyl,

R: methyl, $R^2$: aminopropyl or aminoethylaminopropyl or ethylenetriaminopropyl, R: propyl, $R^2$: aminopropyl or aminoethylaminopropyl or ethylenetriaminopropyl, R: i-butyl, $R^2$: aminopropyl or aminoethylaminopropyl or ethylenetriaminopropyl, R: octyl, $R^2$: aminopropyl or aminoethylaminopropyl or ethylenetriaminopropyl, R: i-octyl, $R^2$: aminopropyl or aminoethylaminopropyl or ethylenetriaminopropyl, R: tridecafluorooctyl, $R^2$: aminopropyl or aminoethylaminopropyl or ethylenetriaminopropyl, R: methacryloxypropyl, $R^2$: aminopropyl or aminoethylaminopropyl or ethylenetriaminopropyl, R: glycidoxypropyl, $R^2$: aminopropyl or aminoethylaminopropyl or ethylenetriaminopropyl.

Mixed propyl/vinylsiloxanes having methoxy or ethoxy as alkoxy group and mixtures thereof, in particular those having degrees of oligomerization (n+m) of from 2 to 4, are preferred.

Said oligomers or cooligomers can, as a result of their preparation, still contain a small but measurable proportion of the organoalkoxysilanes used in the particular case. However, this proportion should not exceed 10% by weight, based on the total weight of the mixture.

The maximum in the droplet size distribution of the emulsions of the invention is preferably at ≤0.36 μm.

The D10 of the emulsions of the invention is preferably ≤0.3 μm, particularly preferably from 0.05 μm to 0.28 μm.

The D90 is advantageously ≤0.88 μm, in particular from 0.2 μm to 0.5 μm.

Furthermore, preference is given to a D50 of ≤0.5 μm, particularly preferably ≤0.4 μm, in particular from 0.1 to 0.3 μm.

The emulsions of the invention comprise at least one emulsifier, preferably an emulsifier system composed of two or more emulsifiers. The emulsifier or emulsifiers can be present in amounts of from 0.02 to 2% by weight, based on the total weight of the emulsion.

Suitable emulsifiers are selected, for example, from among alkylsulfates having a $C_8$-$C_{18}$-alkyl radical, alkyl ether sulfates and alkaryl ether sulfates having a $C_8$-$C_{18}$-alkyl radical as hydrophobic radical and from 1 to 40 ethylene oxide (EO) or propylene oxide (PO) units, alkylsulfonates having a $C_8$-$C_{18}$-alkyl radical, alkarylsulfonates having a $C_8$-$C_{18}$-alkyl radical, monoesters of sulfosuccinic acid with monohydric alcohols or alkylphenols having from 5 to 15 carbon atoms, alkali metal and ammonium salts of carboxylic acids having from 8 to 20 carbon atoms in the alkyl, aryl, alkaryl or aralkyl radical, alkylphosphates and alkarylphosphates having from 8 to 20 carbon atoms in the organic radical, alkyl ether phosphates or alkaryl ether phosphates having from 8 to 20 carbon atoms in the alkyl or alkaryl radical and from 1 to 40 EO units, alkyl polyglycol ethers and alkaryl polyglycol ethers having from 8 to 40 EO units and from 8 to 20 carbon atoms in the alkyl or aryl radicals, ethylene oxide-propylene oxide (EO-PO) block copolymers having from 8 to 40 EO and PO units, addition products of alkylamines having $C_8$-$C_{22}$-alkyl radicals with ethylene oxide or propylene oxide, alkyl polyglycosides having linear or branched, saturated or unsaturated $C_8$-$C_{24}$-alkyl radicals and oligoglycoside radicals having from 1 to 10 hexose or pentose units, silicon-functional surfactants or mixtures of these emulsifiers. Particularly useful emulsifiers are silicon-functional surfactants of the general formulae

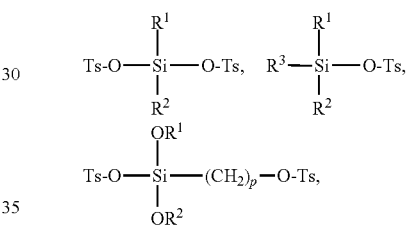

where $R^1$ and $R^2$ are identical or different and are each straight-chain or branched $C_1$-$C_{20}$-alkyl, preferably $C_1$-$C_{10}$-alkyl, or phenyl, $R^3$ is $C_1$-$C_{10}$-alkyl, p is a integer from 0 to 3 and Ts is a surfactant radical selected from among

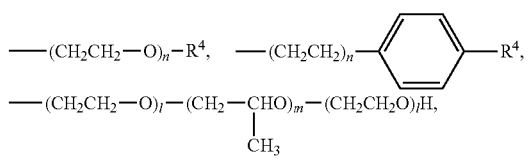

where n is an integer from 3 to 15, m is an integer from 3 to 50 and l is an integer from 3 to 25, $R^4$ is H, $C_1$-$C_{20}$-alkyl, $C_2$-$C_{36}$-alkenyl, $C_5$-$C_8$-cycloalkyl, $C_7$-$C_{36}$-aralkyl.

Particular preference is given to a combination of alkylsulfates having $C_8$-$C_{18}$-alkyl radicals, for example laurylsulfates, and silicon-functional surfactants of the formula

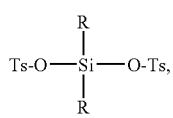

where R is methyl, ethyl, methoxy or ethoxy and the surfactant radical is

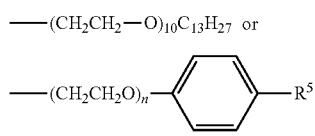

where, in the formula, n is an integer from 5 to 15 and $R^5$ is a straight-chain or branched $C_6$-$C_{10}$-alkyl radical.

A surfactant of the above formulae in which $R=CH_3$, $n=1$ to 30 and $R^5$=isononyl is particularly suitable. This surfactant will hereinafter be referred to as surfactant A.

In addition to the hydrophobicizing active ingredient(s), water and the at least one emulsifier, the aqueous emulsions of the invention can further comprise customary auxiliaries selected from among inorganic and organic acids, buffer substances, fungicides, bactericides, algaecides, microbicides, fragrances, corrosion inhibitors, preservatives, rheological auxiliaries such as pyrogenic silica or bentonites, water repellents such as fluoropolymers, hydrophobic pyrogenic silicas, those based on reactive organosiloxanes, silicone resins, catalysts such as organic tin, titanium or zirconium compounds, e.g. dibutyltin dilaurate, titanium alkoxides or zirconium alkoxides (e.g. tetrabutyl titanate).

The auxiliaries can be present in amounts of from 0.005 to 10% by weight, based on the total weight of the emulsion.

The desired pH can be set by addition of acid or of alkali compounds or by means of customary buffer systems, e.g. $NaHCO_3$, sodium acetate/acetic acid or alkali metal phosphates.

The exact determination of the viscosity of the emulsions of the invention is difficult because of their non-Newtonian flow behavior. However, guide values can be determined by means of a rotational viscometer at room temperature (20° C.) using particular spindles and an appropriately low speed of rotation.

The viscosity determined in this way is ≤100 mPas, preferably from 4 to 100 mPas, very particularly preferably from 10 to 20 mPas.

The aqueous emulsions of the invention which have been prepared by the above-described process can be used for the hydrophobicization and surface modification of textiles, leather, cellulose products and starch products, for coating glass fibers and mineral fibers, for the surface modification of fillers and as release agents.

Particular preference is given to the use for hydrophobicizing porous mineral building materials such as concrete, limestone, lime-sand brick and clay bricks.

The invention is illustrated by the following examples which do not, however, restrict the scope of the invention.

COMPARATIVE EXAMPLE 1

Composition of the emulsion:
48.3% by weight of water,
49.2% by weight of n-propyltriethoxysilane,
0.96% by weight of silicon-functional emulsifier type A,
0.64% by weight of sodium laurylsulfate ($C_{12}$-$C_{16}$),
0.8% by weight of water repellent (reactive organopolysiloxane),
0.1% by weight of preservative CIT/MIT*),
1.5 g/kg of silane $NaHCO_3$
*) CIT=chloromethylisothiazolinone, MIT=methylisothiazolinone The soluble constituents of the composition were firstly dissolved in the initially charged aqueous phase with stirring and the oil phase was then mixed in. The stirring-in of air should be avoided. The mixing time was from 5 to 10 minutes. Pre emulsification was subsequently carried out for 20 minutes at 16 MPa in the first pressure stage and 3 MPa in the second pressure stage of a high-pressure homogenizer.

The emulsion, which initially had a homogeneous milky appearance, was not stable; after only 24 hours, a clear phase began to separate out at the surface.

The droplet size distribution after preemulsification was as follows:
Position of the maximum at 1.1 μm.
D90=4 to 7 μm, D50=0.83 μm, D10=0.17 μm, span from 4.6 to 8.2.

In a second step, emulsification was continued in the high-pressure homogenizer using 50 MPa in the first pressure stage and 10 MPa in the second pressure stage.

A mean droplet size of 0.1 μm was achieved. The position of the maximum of the particle size distribution was 0.07 μm.
D90=0.18 μm, D50=0.082 μm, D10=0.054 μm. The span was 1.6.

The storage stability in concentrated form was found to be insufficient, and still not satisfactory on dilution with an equal amount of water.

Comparative example 1 showed that alkoxysilanes were able to be emulsified in water in the presence of emulsifiers but the emulsification behavior was not sufficiently good to obtain very fine emulsions having a narrow droplet size distribution.

EXAMPLE 2

Composition of the emulsion:
48.3% by weight of water,
49.2% by weight of propyltriethoxysiloxane having a degree of oligomerization of from 2 to 4,
0.96% by weight of silicon-functional emulsifier type A,
0.64% by weight of sodium laurylsulfate ($C_{12}$-$C_{16}$),
0.8% by weight of water repellent (reactive organopolysiloxane),
0.1% by weight of preservative CIT/MIT,
1.5 g/kg of silane $NaHCO_3$ The soluble constituents of the composition were firstly dissolved in the initially charged aqueous phase over a period of 5 to 10 minutes with stirring and the oil phase was then mixed in. The stirring-in of air should be avoided. Emulsification was subsequently carried out for 25 minutes in a high-pressure homogenizer using 15 MPa in the first pressure stage and 3 MPa in the second pressure stage.

The emulsion obtained was storage-stable for more than 6 months. The storage stability after dilution with an equal amount of water was also found to be good.

The emulsion had the following droplet size distribution:
mean droplet size 0.25 μm, position of the maximum of the droplet size distribution curve at 0.25 μm,
D90=0.35 μm, D50=0.25 μm, D10=0.16 μm. The span was 0.76.

Example 2 showed that oligomers of the alkoxysilane used in example 1 have a significantly better emulsification behavior than the monomeric silanes. The desired low mean droplet size and narrow droplet size distribution could be achieved even without preemulsification.

EXAMPLE 3

Composition of the emulsion:
48.3% by weight of water,
35.9% by weight of n-propyltriethoxysilanei, 13.6% by weight of propyltriethoxysiloxane having a degree of oligomerization of from 2 to 4,
0.96% by weight of silicon-functional emulsifier type A,
0.64% by weight of sodium laurylsulfate ($C_{12}$-$C_{16}$),
0.8% by weight of water repellent (reactive organopolysiloxane),
0.1% by weight of preservative CIT/MIT,
1.5 g/kg of silane $NaHCO_3$ The soluble constituents of the composition were firstly dissolved in the initially charged aqueous phase over a period of from 5 to 10 minutes with stirring and the oil phase was subsequently mixed in. The stirring-in of air should be avoided. Emulsification was subsequently carried out over a period of 10 minutes in a high-pressure homogenizer using 15 MPa in the first pressure stage and 3 MPa in the second pressure stage.

The emulsion obtained was storage-stable for more than 6 months. The storage stability after dilution with an equal amount of water was also found to be good.

The emulsion had the following droplet size distribution:
mean droplet size 0.13 µm, position of the maximum of the droplet size distribution curve at 0.13 µm,
D90=0.20 µm, D50=0.12 µm, D10=0.07 µm. The span was 1.16.

The example showed that concomitant use of oligomers improves the emulsification behavior of alkylalkoxysilanes in water so that very fine emulsions having a narrow droplet size distribution could be obtained.

COMPARATIVE EXAMPLE 4

Composition of the emulsion:
48.25% by weight of water,
49.2% by weight of triethoxyoctylsilane,
0.96% by weight of silicon-functional emulsifier type A,
0.64% by weight of sodium laurylsulfate ($C_{12}$-$C_{16}$),
0.15% by weight of preservative CIT/MIT,
0.8% by weight of water repellent (reactive siloxane resin),
1.5 g/kg of silane $NaHCO_3$ The soluble constituents of the composition were firstly dissolved in the initially charged aqueous phase with stirring and the oil phase was then mixed in. The stirring-in of air should be avoided. Emulsification was subsequently carried out in a high-pressure homogenizer, with a pressure of 3.0 MPa firstly being set in pressure stage II and a pressure of 15 MPa then being set in pressure stage I. Emulsion time: 10 minutes.

The emulsion had the following droplet size distribution:
mean droplet size 0.71 µm, position of the maximum of the droplet distribution curve at 0.32 µm,
D90=1.61 µm, D50=0.38 µm, D10=0.12 µm. The span was 3.9.

Even after a further after-emulsification in the high-pressure homogenizer, the mean particle size could be reduced only slightly. The width of the droplet size distribution which could be achieved did not correspond to the desired small width.

EXAMPLE 5

Composition of the emulsion:
48.17% by weight of water,
49.2% by weight of octylethoxysiloxane,
0.96% by weight of silicon-functional emulsifier type A,
0.64% by weight of sodium laurylsulfate,
0.15% by weight of preservative CIT/MIT,
0.80% by weight of water repellent,
0.08% by weight of $NaHCO_3$.

Preparation and storage stability as in Example 2.
The emulsion had the following droplet size distribution:
mean droplet size 0.30 µm,
D90=0.41 µm, D50=0.30 µm, D10=0.19 µm. The span was 0.73.

EXAMPLE 6

Composition of the emulsion:
48.3% by weight of water,
35.9% by weight of triethoxyoctylsilane,
13.3% by weight of triethoxyoctylsiloxane having a degree of oligomerization of from 2 to 4,
0.96% by weight of silicon-functional emulsifier type A,
0.64% by weight of sodium laurylsulfate ($C_{12}$-$C_{16}$),
0.8% by weight of water repellent (reactive organopolysiloxane),
0.1% by weight of preservative CIT/MIT,
1.5 g/kg of silane $NaHCO_3$ The soluble constituents of the composition were firstly dissolved in the initially charged aqueous phase with stirring and the oil phase was then mixed in. The stirring-in of air should be avoided. The dissolution and mixing in of the oil phase required from 5 to 10 minutes. Emulsification was subsequently carried out over a period of 10 minutes in a high-pressure homogenizer using 15 MPa in the first pressure stage and 3 MPa in the second pressure stage.

The aqueous emulsion obtained was found to be storage-stable for more than 6 months and the storage stability was also good after dilution with an equal amount of water.

The emulsion had the following droplet size distribution:
mean droplet size 0.27 µm, position of the maximum of the droplet size distribution curve at 0.28 µm,
D90=0.37 µm, D50=0.27 µm, D10=0.18 µm. The span is 0.71.

EXAMPLE 7

Composition of the emulsion:
48.17% by weight of water,
46.74% by weight of octyltriethoxysilane,
2.46% by weight of octylethoxysiloxane,
0.96% by weight of silicon-functional emulsifier type A,
0.64% by weight of sodium laurylsulfate,
0.15% by weight of preservative CIT/MIT,
0.80% by weight of water repellent,
0.08% by weight of $NaHCO_3$ Method of preparation and storage stability as in Example 2.

The droplet size distribution was as follows:
mean droplet size 0.36 µm, position of the maximum of the droplet size distribution curve 0.36 µm,
D90=0.49 µm, D50=0.34 µm, D10=0.19 µm. The span was 0.86.

EXAMPLE 8

Composition of the emulsion:
48.17% by weight of water,
39.36% by weight of octyltriethoxysilane,
9.84% by weight of octylethoxysiloxane,
0.96% by weight of silicon-functional emulsifier type A,
0.64% by weight of sodium laurylsulfate,
0.15% by weight of preservative CIT/MIT,
0.80% by weight of water repellent,
0.08% by weight of $NaHCO_3$ Method of preparation and storage stability as in Example 2.

The droplet size distribution was as follows:
mean droplet size 0.27 μm, position of the maximum of the droplet size distribution curve at 0.33 μm,
D90=0.41 μm, D50=0.29 μm, D10=0.28 μm. The span was 1.13.

EXAMPLE 9

Composition of the emulsion:
48.3% by weight of water,
41.82% by weight of triethoxyoctylsilane,
7.38% by weight of propyltriethoxysiloxane having a degree of oligomerization of from 2 to 4,
0.96% by weight of silicon-functional emulsifier type A,
0.64% by weight of sodium laurylsulfate ($C_{12}$-$C_{16}$),
0.8% by weight of water repellent (reactive organopolysiloxane),
0.1% by weight of preservative CIT/MIT,
1.5 g/kg of silane $NaHCO_3$ The soluble constituents of the composition were firstly dissolved in the initially charged aqueous phase with stirring and the oil phase was then mixed in. The stirring-in of air should be avoided. Emulsification was subsequently carried out over a period of 10 minutes in a high-pressure homogenizer using 15 MPa in the first pressure stage and 3 MPa in the second pressure stage.

The aqueous emulsion obtained was found to be storage-stable for more than 6 months and the storage stability was also satisfactory after dilution with an equal amount of water.

The emulsion had the following droplet size distribution:
mean droplet size 0.44 μm.

EXAMPLE 10

Composition of the emulsion:
48.3% by weight of water,
39.36% by weight of triethoxyoctylsilane,
9.84% by weight of propyltriethoxysiloxane having a degree of oligomerization of from 2 to 4,
0.96% by weight of silicon-functional emulsifier type A,
0.64% by weight of sodium laurylsulfate ($C_{12}$-$C_{16}$),
0.8% by weight of water repellent (reactive organopolysiloxane),
0.1% by weight of preservative CIT/MIT,
1.5 g/kg of silane $NaHCO_3$ The soluble constituents of the composition were firstly dissolved in the initially charged aqueous phase with stirring and the oil phase was then mixed in. The stirring-in of air should be avoided. Emulsification was subsequently carried out over a period of 10 minutes in a high-pressure homogenizer using 15 MPa in the first pressure stage and 3 MPa in the second pressure stage.

The aqueous emulsion obtained was found to be storage-stable for more than 6 months and lost only little of its storage stability after dilution with an equal amount of water.

The emulsion had the following droplet size distribution:
mean droplet size 0.31 μm, bimodal droplet size distribution, 1st maximum below 0.1 μm, 2nd maximum of the droplet size distribution curve at 0.36 μm,
D90=0.46 μm, D50=0.33 μm, D10=0.09 μm. The span was 1.2.

Use test on an emulsion corresponding to Example 2 (100% oligomers in the oil phase) in comparison with a commercial emulsion based on methylsilicone resins.

The penetration depth of the active composition was in each case determined on concrete test specimens after treatment with emulsions. The penetration depth was critical to a good and long-lasting effectiveness of hydrophobicization methods. Penetration depths of 1 mm or less were not acceptable. A very high penetration depth was desired. The application of the emulsions was carried out as follows: the respective test specimen was dipped twice into the impregnation liquid so that it was fully immersed for 5 seconds each time, with a time of 1 minute between the immersions. The amount of impregnation liquid consumed was determined by difference weighing. This dipping procedure simulated to a good approximation the spray application by means of airless equipment which is customary in practice (one application). Higher applied amounts could be achieved only by means of multiple application (two or more spray applications with corresponding additional work). The amounts consumed reported in the table thus indicate the applied amounts which are achievable in one application in practice. Emulsions which make possible a very high applied amount in this procedure naturally display advantageous penetration behavior in practice.

After a reaction time of 14 days, the test specimens were split and the penetration depth of the hydrophobicizing material was determined by wetting the fresh fracture surface with water. Impregnated, hydrophobic regions were not wetted by water.

Before impregnation, the emulsions were adjusted to the same active content of 40% by weight by means of water. The emulsion from Example 2 had an original active content of 50% by weight, while the comparative emulsion Baysilone WB had an original active content of 58% by weight.

The results are reported in the following table.

TABLE

| Impregnant | Applied amount g/m$^2$ | Penetration depth mm |
|---|---|---|
| Baysilone WB (40%) | 80 | 0.5 |
| Example 2 (40%) | 207 | 2.7 |

A further advantage of the emulsions of the invention compared to the prior art was the improved flash point behavior. Alkyltrialkoxysilane emulsions displayed an alcohol content with increasing storage time, due to hydrolysis of the active ingredient. The alcohols formed were in general methanol or ethanol. Both substances can dramatically reduce the flash point of the emulsions in question. Thus, commercial comparative emulsions such as Enviroseal 20 displayed a flash point of 59° C. after a storage time of a few months, and that of Baysilone WB (58% active content) was only 26° C., while the emulsion from Example 2 displayed a flash point of >75° C. under the same storage conditions and could therefore be classified as nonflammable liquid.

The invention claimed is:
1. An aqueous oil-in-water emulsion, comprising:
from 1 to 70% by weight, based on the total weight of the emulsion, of a condensed oligomer of a functional alkoxysilane; an organoalkoxysiloxane; a combination thereof; or a mixture of a functional alkoxysilane and at least one of a condensed oligomer thereof and an organoalkoxysiloxane;
an emulsifier; and
water,
wherein
the emulsion has a pH of from 5 to 9;

the emulsion has a disperse phase having a mean droplet size of from 0.1 to 0.3 μm;
the width of the droplet size distribution, expressed as $$\frac{D90 - D10}{D50},$$

is from 0.6 to 1.2;
said D50 has a value of from 0.1 to 0.3 um, wherein the D50 represents the diameter of that droplet is larger than 50% by weight of all droplets and smaller than 50% by weight of all droplets;
said emulsifier comprises a silicon-functional surfactant represented by $$Ts-O-\underset{\underset{R^2}{|}}{\overset{\overset{R^1}{|}}{Si}}-O-Ts, \quad R^3-\underset{\underset{R^2}{|}}{\overset{\overset{R^1}{|}}{Si}}-O-Ts, \quad \text{or}$$

$$Ts-O-\underset{\underset{OR^2}{|}}{\overset{\overset{OR^1}{|}}{Si}}+CH_2\underset{p}{\rightarrow}O-Ts$$

where
each $R^1$ and $R^2$ is identical or different and is a straight-chain or branched $C_1$-$C_{20}$-alkyl group or a phenyl group, $R^3$ is an $C_1$-$C_{10}$-alkyl group,
p is an integer of from 0 to 3, and
Ts is a surfactant radical represented by $$-(CH_2CH_2-O)_n-R^4, \quad -(CH_2CH_2)_n-\!\!\!\bigcirc\!\!\!-R^4, \quad \text{or}$$

$$-(CH_2CH_2-O)_l-(CH_2-\underset{\underset{CH_3}{|}}{CHO})_m-(CH_2CH_2)H,$$

where
n is an integer of from 3 to 15,
m is an integer of from 3 to 50,
l is an integer of from 3 to 25,
$R^4$ is H, a $C_1$-$C_{20}$-alky group, a $C_2$-$C_{36}$-alkenyl group, a $C_5$-$C_8$-cycloalkyl group, or a $C_7$-$C_{36}$-aralkyl group;
said emulsifier optionally further comprises is at least one member selected from the group consisting of
an alkylsulfate having a $C_8$-$C_{18}$-alkyl radical,
an alkyl ether sulfate having a $C_8$-$C_{18}$-alkyl radical as hydrophobic radical and from 1 to 40 ethylene oxide (EO) or propylene oxide (PO) units,
an alkaryl ether sulfate having a $C_8$-$C_{18}$-alkyl radical as hydrophobic radical and from 1 to 40 ethylene oxide (EO) or propylene oxide (PO) units,
an alkylsulfonate having a $C_8$-$C_{18}$-alkyl radical,
an alkarylsulfonate having a $C_8$-$C_{18}$-alkyl radical,
a monoester of sulfosuccinic acid with a monohydric alcohol having from 5 to 15 carbon atoms,
a monoester of sulfosuccinic acid with an alkylphenol having from 5 to 15 carbon atoms,
an alkali metal salt of a carboxylic acid having from 8 to 20 carbon atoms in the alkyl, aryl, alkaryl or aralkyl radical,
an ammonium salt of a carboxylic acid having from 8 to 20 carbon atoms in the alkyl, aryl, alkaryl or aralkyl radical,
an alkylphosphate having from 8 to 20 carbon atoms in the organic radical,
an alkarylphosphate having from 8 to 20 carbon atoms in the organic radical,
an alkyl ether phosphate having from 8 to 20 carbon atoms in the alkyl radical and from 1 to 40 EO units,
an alkaryl ether phosphate having from 8 to 20 carbon atoms in the alkaryl radical and from 1 to 40 EO units,
an addition product of an alkylamine having $C_8$-$C_{22}$-alkyl radicals with ethylene oxide or propylene oxide, and
an alkyl polyglycoside having a linear or branched, saturated or unsaturated $C_8$-$C_{24}$-alkyl radical and an oligoglycoside radical having from 1 to 10 hexose or pentose units; and
said condensed oligomer of the functional alkoxysilane is at least one compound represented by $$R^2-O[SiO]_n-\underset{\underset{OR^2}{|}}{\overset{\overset{R^1}{|}}{}}R^2,$$

where
each $R^1$ group is, independently, a $C_3$-$C_{18}$-alkyl group, a halogen- or amino-substituted $C_3$-$C_{18}$-alkyl group, a vinyl group, a mercaptoalkyl group, a methacryloxyalkyl group, an acryloxyalkyl group, an alkylaminoalkyl group, a dialkylaminoalkyl group, a diethyleneaminoalkyl group, a triethyleneaminoalkyl group, a glycidyloxyalkyl group, a bisalkoxysilylalkyl group, a monosulfane or a polysulfane,
each $R^2$ group is, independently, a hydrogen atom or an alkyl radical having from 1 to 6 carbon atoms, and
n represents the degree of oligomerization and is an integer of from 2 to 20, or
is at least one compound represented by $$R^1O-[SiO]_m-[\underset{\underset{OR^1}{|}}{\overset{\overset{R}{|}}{Si}}-O-]_nR^1,$$

where
m and n are identical or different and are each from 0 to 20, with the proviso that (n+m)≥2,
each R and $R^2$ group is, independently, hydrogen, a $C_1$-$C_{18}$-alkyl group, a halogen- or amino-substituted $C_1$-$C_{18}$-alkyl group, a phenyl group, a vinyl group, a mercaptoalkyl group, a methacryloxyalkyl group, an acryloxyalkyl group, an alkylaminoalkyl group, a dialkylaminoalkyl group, a diethyleneaminoalkyl group, a triethyleneaminoalkyl group, a glycidyloxyalkyl group, a bisalkoxysilylalkyl group, a monosulfane or a polysulfane, and
each $R^1$ group is, independently, a hydrogen atom or an alkyl radical having from 1 to 6 carbon atoms.

2. The aqueous oil-in-water emulsion according to claim 1, wherein said at least one emulsifier is present in said emulsion in an amount of from 0.02 to 2% by weight, relative to the total weight of the emulsion.

3. The aqueous oil-in-water emulsion according to claim 1, wherein said at least one emulsifier is present in said emulsion in an amount of from 1.6 to 2% by weight, relative to the total weight of the emulsion.

4. The emulsion as claimed in claim 1, wherein the emulsion has a disperse phase having a mean droplet size of from 0.1 to 0.27 µm.

5. The emulsion as claimed in claim 1, wherein the emulsion has a disperse phase having a mean droplet size of from 0.1 to 0.25 µm.

6. The emulsion as claimed in claim 1, wherein said condensed oligomer of a functional alkoxysilane is present in an amount of from 1 to 100% by weight, based on the total weight of the oil phase.

7. The emulsion as claimed in claim 1, wherein said functional alkoxysilane is at least one alkylalkoxysilane represented by

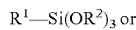

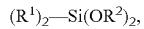

where each $R^1$ radical is, independently, a $C_3$-$C_{18}$-alkyl group, a halogen- or amino-substituted $C_3$-$C_{18}$-alkyl group, a vinyl group, a mercaptoalkyl group, a methacryloxyalkyl group, an acryloxyalkyl group, an alkylaminoalkyl group, a dialkylaminoalkyl group, a diethyleneaminoalkyl group, a triethyleneaminoalkyl group, a glycidyloxyalkyl group, a bisalkoxysilylalkyl group, a monosulfane or a polysulfane, and
each $R^2$ radical is an alkyl radical having from 1 to 6 carbon atoms.

8. The emulsion as claimed in claim 7, wherein $R^2$ is an alkyl radical having 1 or 2 carbon atoms.

9. The emulsion as claimed in claim 1, wherein said condensed oligomer of a functional alkoxysilane is at least one compound represented by

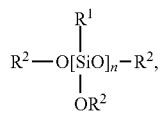

where
each $R^1$ group is, independently, a $C_3$-$C_{18}$-alkyl group, a halogen- or amino-substituted $C_3$-$C_{18}$-alkyl group, a vinyl group, a mercaptoalkyl group, a methacryloxyalkyl group, an acryloxyalkyl group, an alkylaminoalkyl group, a dialkylaminoalkyl group, a diethyleneaminoalkyl group, a triethyleneaminoalkyl group, a glycidyloxyalkyl group, a bisalkoxysilylalkyl group, a monosulfane or a polysulfane,
each $R^2$ group is, independently, a hydrogen atom or an alkyl radical having from 1 to 6 carbon atoms, and
n represents the degree of oligomerization and is an integer of from 2 to 20.

10. The emulsion as claimed in claim 9, wherein the groups $R^2$ are identical or different and are each a hydrogen atom or an alkyl radical having 1 or 2 carbon atoms.

11. The emulsion as claimed in claim 1, wherein the condensed oligomer is at least one compound represented by

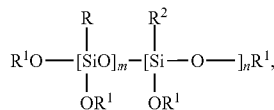

where
m and n are identical or different and are each from 0 to 20, with the proviso that (n+m)≥2, each R and $R^2$ group is, independently, hydrogen, a $C_1$-$C_{18}$-alkyl group, a halogen- or amino-substituted $C_1$-$C_{18}$-alkyl group, a phenyl group, a vinyl group, a mercaptoalkyl group, a methacryloxyalkyl group, an acryloxyalkyl group, an alkylaminoalkyl group, a dialkylaminoalkyl group, a diethyleneaminoalkyl group, a triethyleneaminoalkyl group, a glycidyloxyalkyl group, a bisalkoxysilylalkyl group, a monosulfane or a polysulfane, and
each $R^1$ group is, independently, a hydrogen atom or an alkyl radical having from 1 to 6 carbon atoms.

12. The emulsion as claimed in claim 11, wherein at least one emulsifier is present in an amount of from 0.02 to 2% by weight, based on the total weight of the emulsion.

13. The emulsion as claimed in claim 11, wherein the groups $R^1$ are identical or different and are each a hydrogen atom or an alkyl radical having 1 or 2 carbon atoms.

14. The emulsion as claimed in claim 1, which further comprises an auxiliary selected from the group consisting of an inorganic acid, an organic acid, a buffer, a fungicide, a bactericide, an algaecide, a microbicide, a fragrance, a corrosion inhibitor, a preservative, a water repellant, a viscosity modifier, and a catalyst.

15. An aqueous oil-in-water emulsion, comprising:
from 1 to 70% by weight, based on the total weight of the emulsion, of a condensed oligomer of a functional alkoxysilane; an organoalkoxysiloxane; a combination thereof; or a mixture of a functional alkoxysilane and at least one of a condensed oligomer thereof and an organoalkoxysiloxane;
an emulsifier; and
water,
wherein
the emulsion has a pH of from 5 to 9;
the emulsion has a disperse phase having a mean droplet size of from 0.1 to 0.3 µm;
the width of the droplet size distribution, expressed as $$\frac{D90 - D10}{D50},$$

is from 0.6 to 1.2;
said D50 has a value of from 0.1 to 0.3 um, wherein the D50 represents the diameter of that droplet is larger than 50% by weight of all droplets and smaller than 50% by weight of all droplets;
said emulsifier comprises an alkylsulfate having a $C_8$-$C_{18}$-alkyl radical and a silicon-functional surfactant represented by

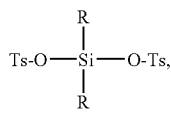

where each R represents a methyl group and Ts represents

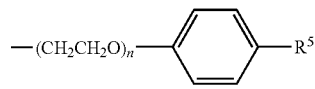

where n is an integer of 1 to 30 and $R^5$ is an isononyl group;

said emulsifier optionally further comprises at least one member selected from the group consisting of an alkylsulfate having a $C_8$-$C_{18}$-alkyl radical,
an alkyl ether sulfate having a $C_8$-$C_{18}$-alkyl radical as hydrophobic radical and from 1 to 40 ethylene oxide (EO) or propylene oxide (PO) units,
an alkaryl ether sulfate having a $C_8$-$C_{18}$-alkyl radical as hydrophobic radical and from 1 to 40 ethylene oxide (EO) or propylene oxide (PO) units,
an alkylsulfonate having a $C_8$-$C_{18}$-alkyl radical,
an alkarylsulfonate having a $C_8$-$C_{18}$-alkyl radical,
a monoester of sulfosuccinic acid with a monohydric alcohol having from 5 to 15 carbon atoms,
a monoester of sulfosuccinic acid with an alkylphenol having from 5 to 15 carbon atoms,
an alkali metal salt of a carboxylic acid having from 8 to 20 carbon atoms in the alkyl, aryl, alkaryl or aralkyl radical,
an ammonium salt of a carboxylic acid having from 8 to 20 carbon atoms in the alkyl, aryl, alkaryl or aralkyl radical,
an alkylphosphate having from 8 to 20 carbon atoms in the organic radical,
an alkarylphosphate having from 8 to 20 carbon atoms in the organic radical,
an alkyl ether phosphate having from 8 to 20 carbon atoms in the alkyl radical and from 1 to 40 EO units,
an alkaryl ether phosphate having from 8 to 20 carbon atoms in the alkaryl radical and from 1 to 40 EO units,
an addition product of an alkylamine having $C_8$-$C_{22}$-alkyl radicals with ethylene oxide or propylene oxide, and
an alkyl polyglycoside having a linear or branched, saturated or unsaturated $C_8$-$C_{24}$-alkyl radical and an oligoglycoside radical having from 1 to 10 hexose or pentose units; and said condensed oligomer of the functional alkoxysilane is at least one compound represented by

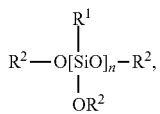

where
each $R^1$ group is, independently, a $C_3$-$C_{18}$-alkyl group, a halogen- or amino-substituted $C_3$-$C_{18}$-alkyl group, a vinyl group, a mercaptoalkyl group, a methacryloxyalkyl group, an acryloxyalkyl group, an alkylaminoalkyl group, a dialkylaminoalkyl group, a diethyleneaminoalkyl group, a triethyleneaminoalkyl group, a glycidyloxyalkyl group, a bisalkoxysilylalkyl group, a monosulfane or a polysulfane,
each $R^2$ group is, independently, a hydrogen atom or an alkyl radical having from 1 to 6 carbon atoms, and
n represents the degree of oligomerization and is an integer of from 2 to 20, or
is at least one compound represented by

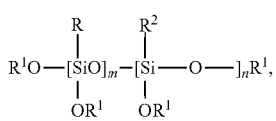

where
m and n are identical or different and are each from 0 to 20, with the proviso that (n+m)≥2,
each R and $R^2$ group is, independently, hydrogen, a $C_1$-$C_{18}$-alkyl group, a halogen- or amino-substituted $C_1$-$C_{18}$-alkyl group, a phenyl group, a vinyl group, a mercaptoalkyl group, a methacryloxyalkyl group, an acryloxyalkyl group, an alkylaminoalkyl group, a dialkylaminoalkyl group, a diethyleneaminoalkyl group, a triethyleneaminoalkyl group, a glycidyloxyalkyl group, a bisalkoxysilylalkyl group, a monosulfane or a polysulfane, and
each $R^1$ group is, independently, a hydrogen atom or an alkyl radical having from 1 to 6 carbon atoms.

16. The emulsion as claimed in claim 15, wherein said condensed oligomer of a functional alkoxysilane is at least one compound represented by

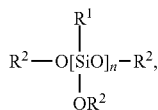

where
each $R^1$ group is, independently, a $C_3$-$C_{18}$-alkyl group, a halogen- or amino-substituted $C_3$-$C_{18}$-alkyl group, a vinyl group, a mercaptoalkyl group, a methacryloxyalkyl group, an acryloxyalkyl group, an alkylaminoalkyl group, a dialkylaminoalkyl group, a diethyleneaminoalkyl group, a triethyleneaminoalkyl group, a glycidyloxyalkyl group, a bisalkoxysilylalkyl group, a monosulfane or a polysulfane,
each $R^2$ group is, independently, a hydrogen atom or an alkyl radical having from 1 to 6 carbon atoms, and
n represents the degree of oligomerization and is an integer of from 2 to 20.

17. The emulsion as claimed in claim 15, wherein the condensed oligomer is at least one compound represented by

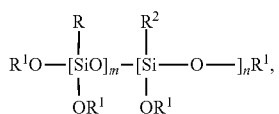

where
m and n are identical or different and are each from 0 to 20, with the proviso that (n+m)≥2,
each R and $R^2$ group is, independently, hydrogen, a $C_1$-$C_{18}$-alkyl group, a halogen- or amino-substituted $C_1$-$C_{18}$-alkyl group, a phenyl group, a vinyl group, a mercaptoalkyl group, a methacryloxyalkyl group, an acryloxyalkyl group, an alkylaminoalkyl group, a dialkylaminoalkyl group, a diethyleneaminoalkyl group, a triethyleneaminoalkyl group, a glycidyloxyalkyl group, a bisalkoxysilylalkyl group, a monosulfane or a polysulfane, and
each $R^1$ group is, independently, a hydrogen atom or an alkyl radical having from 1 to 6 carbon atoms.

18. The emulsion as claimed in claim 15, wherein the emulsion has a disperse phase having a mean droplet size of from 0.1 to 0.27 μm.

19. The emulsion as claimed in claim 15, wherein the emulsion has a disperse phase having a mean droplet size of from 0.1 to 0.25 μm.

* * * * *